(12) United States Patent
Swift et al.

(10) Patent No.: US 9,403,703 B2
(45) Date of Patent: Aug. 2, 2016

(54) GUANIDINE-BASED POLYMERS FOR SEPARATION PROCESSES

(75) Inventors: Brian L. Swift, Oxford, GA (US); Pablo G. Dopico, Conyers, GA (US); Roger S. Johnson, Lilburn, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 558 days.

(21) Appl. No.: 12/822,855

(22) Filed: Jun. 24, 2010

(65) Prior Publication Data

US 2010/0331484 A1 Dec. 30, 2010

Related U.S. Application Data

(60) Provisional application No. 61/219,835, filed on Jun. 24, 2009.

(51) Int. Cl.

| | |
|---|---|
| *B01D 1/00* | (2006.01) |
| *B03D 1/00* | (2006.01) |
| *C02F 1/24* | (2006.01) |
| *C02F 1/56* | (2006.01) |
| *C02F 1/52* | (2006.01) |
| *C02F 1/54* | (2006.01) |
| *C08G 16/02* | (2006.01) |
| *C08L 61/20* | (2006.01) |
| *C08L 61/32* | (2006.01) |

(52) U.S. Cl.
CPC ... *C02F 1/56* (2013.01); *C02F 1/52* (2013.01); *C02F 1/54* (2013.01); *C08G 16/025* (2013.01); *C08L 61/20* (2013.01); *C08L 61/32* (2013.01)

(58) Field of Classification Search
CPC ............. C02F 1/56; C02F 1/52; C02F 1/5272; C02F 1/54; C08G 14/06; C08G 14/00; C08G 14/08; C08G 14/12; C08G 16/025; C08G 16/0268; C08L 61/20; C08L 61/24; C08L 61/32; C08L 61/34
USPC ............... 524/588, 1, 2, 6, 68, 271, 430, 434, 524/439, 442, 541, 593, 650; 210/720, 705, 210/723, 726, 729, 732, 735
See application file for complete search history.

(56) References Cited

U.S. PATENT DOCUMENTS

| | | |
|---|---|---|
| 1,658,597 A | 2/1928 | Griffith |
| 1,780,636 A | 11/1930 | Stine |
| 2,668,808 A | 2/1954 | Robinson |

(Continued)

FOREIGN PATENT DOCUMENTS

| | | | |
|---|---|---|---|
| DE | 1243646 | 7/1967 | |
| JP | 2751932 B2 * | 5/1998 | ............... C01G 5/00 |
| RU | 724203 | 3/1980 | |

OTHER PUBLICATIONS

Machine translation of JP 2751932 B2, Kuriyama et al., May 1998 see pdf "Kuriyama_JP2751932B2_MachTrans.pdf".*

*Primary Examiner* — Jane L Stanley
(74) *Attorney, Agent, or Firm* — Ram W. Sabnis

(57) ABSTRACT

Cationic polymers and methods for using the same are provided. The method can include contacting an aqueous medium with a cationic polymer. The cationic polymer can include a polymer formed by reacting an aldehyde, and optionally an aldehyde-reactive compound, in the presence of a sufficient amount of guanidine to provide the polymer with a net cationic charge.

29 Claims, 1 Drawing Sheet

(56) References Cited

U.S. PATENT DOCUMENTS

| | | |
|---|---|---|
| 2,826,500 A | 3/1958 | Keim |
| 5,010,164 A | 4/1991 | Schollhorn |
| 5,362,842 A | 11/1994 | Graves et al. |
| 5,389,716 A | 2/1995 | Graves |
| 6,034,201 A | 3/2000 | Schollhorn |
| 2006/0151360 A1 | 7/2006 | Wright et al. |
| 2007/0000839 A1* | 1/2007 | Wright et al. ............ 210/660 |
| 2008/0017552 A1* | 1/2008 | Wright et al. ............ 209/167 |
| 2009/0301972 A1* | 12/2009 | Hines et al. ............ 210/705 |

\* cited by examiner

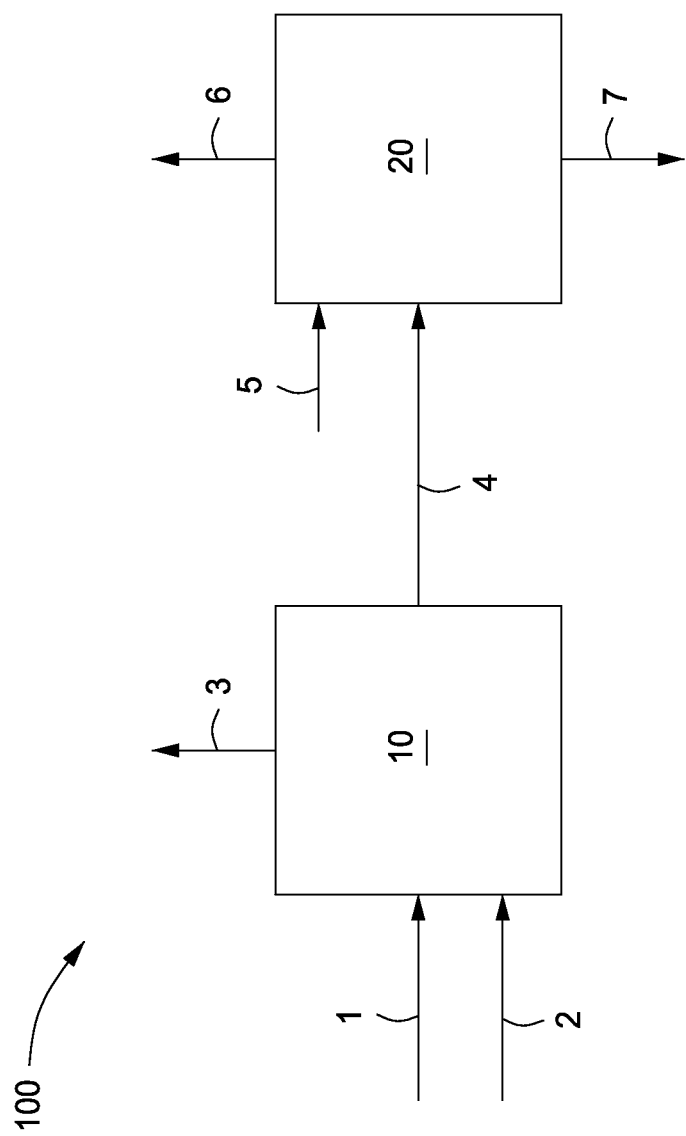

GUANIDINE-BASED POLYMERS FOR SEPARATION PROCESSES

FIELD OF THE INVENTION

Embodiments of the present disclosure generally relate to cationic polymers which are suitable for use in a variety of separation processes. More particularly, embodiments of the present disclosure related to cationic polymers suitable for use in connection with various flocculation and dewatering processes.

Embodiments of the present disclosure also relate to a method for the concentration of, or for the recovery of, charged materials associated with an aqueous system. More particularly, embodiments of the present disclosure relate to a method for the removal of charged contaminants from water by treating the water with a cationic polymer that promotes flocculation and/or enhances dewaterability.

BACKGROUND OF THE INVENTION

Challenges associated with the separation of, or the recovery of, charged materials, including charged solid contaminants, in connection with aqueous systems, such as industrial process waters, are well known to those skilled in the art.

Historically, a variety of chemical treatments have been proposed for enhancing the settling of, or the filtration of, charged materials from aqueous media. In particular, adding a cationic flocculant to an aqueous media has long been used to enhance the dewatering of suspended solids that have an anionic character, such as in an activated sludge.

Such cationic flocculants often facilitate the agglomeration of solids suspended in the aqueous media, to form a distinct entity, referred to as floc, capable of being separated from at least a portion of the aqueous media. The use and development of synthetic polymers as cationic flocculants has continued to progress and evolve since their introduction several decades ago.

Thus, over the years certain cationic polymers have been suggested, or used as cationic flocculants for enhancing separation processes in such diverse applications as water treatment, papermaking, mineral processing, coal processing, petroleum recovery and refining, and many others. Included among such cationic polymers are the quaternary ammonium polymers of dialkyldiallyl ammonium compounds, e.g., DADMAC; polyethyleneimines; poly(meth) acrylamide/quaternary ammonium salt copolymers; polyamines and the epichlorohydrin functionalized polyalkylene polyamine condensates.

Notwithstanding the wide variety of these cationic flocculants, there remains a need for additional cationic polymers, in addition to the known materials identified above, to be used as cationic flocculants for enhancing separation processes, that have equal or better performance, that have a suitable long term stability, and/or that have suitable sensitivity to process variations, such as changes in temperature and alkalinity.

SUMMARY OF THE INVENTION

Cationic polymers and methods for using the same are provided. The cationic polymer can include a polymer formed by reacting an aldehyde, and optionally an aldehyde-reactive compound, in the presence of a sufficient amount of guanidine to provide the polymer with a net cationic charge.

A method for separating charged material from an aqueous medium can include contacting an aqueous medium with a cationic polymer, where the cationic polymer comprises a polymer formed by reacting an aldehyde, and optionally an aldehyde-reactive compound, in the presence of a sufficient amount of guanidine to provide the polymer with a net cationic charge.

Another method for separating charged material from an aqueous medium can include sequentially treating the aqueous medium with a cationic polymer and with an anionic flocculant. The cationic polymer can include a polymer formed by reacting an aldehyde, and optionally an aldehyde-reactive compound, in the presence of a sufficient amount of guanidine to provide the polymer with a net cationic charge.

A method for purifying clay from a clay-containing ore that includes one or more contaminants selected from the group consisting of metals, metal oxides, and minerals. The method can include treating a slurry of the clay-containing ore with a cationic polymer. The cationic polymer can include a polymer formed by reacting an aldehyde with guanidine and optionally with an aldehyde-reactive compound, where the guanidine is provided in an amount sufficient to provide the polymer with a net cationic charge. The method can also include recovering, by froth flotation at least a portion of one of the contaminants, either after or during treating the slurry of the clay-containing ore, a purified clay having a reduced amount of the at least one of the contaminants.

A method for purifying bitumen from a bitumen-containing slurry that can include sand, clay, or a combination thereof can include treating the bitumen-containing slurry with a cationic polymer. The cationic polymer can include a polymer formed by reacting an aldehyde with guanidine and optionally with an aldehyde-reactive compound, where the guanidine is provided in an amount sufficient to provide the polymer with a net cationic charge. The method can also include recovering, by froth flotation, either after or during treating the bitumen-containing slurry, a purified bitumen having a reduced amount of sand or clay.

A method for purifying an aqueous liquid suspension comprising a solid contaminant can include treating the liquid suspension with a cationic polymer. The cationic polymer can include a polymer formed by reacting an aldehyde with guanidine and optionally with an aldehyde-reactive compound, where the guanidine is provided in an amount sufficient to provide the polymer with a net cationic charge. The method can also include removing, either after or during treating the liquid suspension, at least a portion of said solid contaminant in a contaminant-rich fraction, a purified liquid, or both.

A method for purifying water comprising a metallic cation can include treating the water with a combination of an anionic flocculant and a cationic polymer. The cationic polymer can include a polymer formed by reacting an aldehyde with guanidine and optionally with an aldehyde-reactive compound, where the guanidine is provided in an amount sufficient to provide the polymer with a net cationic charge. The method can also include removing at least a portion of the metallic cation by filtration to yield purified water.

A method for beneficiation of an ore can include treating a slurry of the ore with a cationic polymer. The cationic polymer can include a polymer formed by reacting an aldehyde with guanidine and optionally with an aldehyde-reactive compound, where the guanidine is provided in an amount sufficient to provide the polymer with a net cationic charge. The ore can include one or more minerals selected from the group consisting of phosphate, lime, sulfate, gypsum, iron, platinum, gold, palladium, titanium, molybdenum, copper, uranium, chromium, tungsten, manganese, magnesium, lead, zinc, clay, coal, silver, graphite, nickel, bauxite, borax, borate, and calcium carbonate.

A method for purifying a coal ore can include treating an aqueous slurry of the coal ore with a cationic polymer. The cationic polymer can include a polymer formed by reacting an aldehyde with guanidine and optionally with an aldehyde-reactive compound, where the guanidine is provided in an amount sufficient to provide the polymer with a net cationic charge. Treating the aqueous slurry can occur prior to or during a size or density classification operation which recovers from the coal ore, purified coal having, relative to said coal ore, a reduced amount of an impurity selected from the group consisting of mercury, nitrogen, sulfur, silicon, ash, and pyrite, where the impurity is measured on a volatile free weight basis.

BRIEF DESCRIPTION OF THE FIGURE

The FIGURE depicts a schematic of an illustrative froth flotation process in which one or more materials can be separated in a first (froth flotation) stage from at least a portion of one or more impurities, and in which the so-separated impurities can be concentrated in a second thickening stage.

DETAILED DESCRIPTION OF THE INVENTION

Cationic polymers can be formed by reacting an aldehyde with guanidine and optionally with an aldehyde-reactive compound, where the guanidine is provided in an amount sufficient to provide the polymer with a net cationic charge. The cationic polymers can be used for separating charged material from aqueous media.

The cationic polymers can be used in solid-liquid separation operations or processes that can include, but are not limited to, froth flotation separations, dewatering of sewage sludge, and/or dewatering of other commercial process sludges, including sludges generated in petroleum refinery operations, mineral and coal processing, and pulp and paper processing to name a few. The cationic polymers can be used in other flocculation and filtration processes.

Flotation can also be used as a separation process. For example, flotation can be used to recover, enrich, and/or isolate one or more materials or components contained in an admixture in a liquid suspension or dispersion. In one example, the liquid suspension or dispersion can be an aqueous suspension or dispersion. Separation can be accomplished based on differences in the tendency of one or more of the materials or components in the admixture to associate with rising gas.

Various additives can be incorporated into the liquid e.g. suspension or dispersion. The additive(s) can modify, alter, or otherwise adjust the selectivity of the separation process. For example, additives identified as "collectors" can be used to chemically and/or physically absorb onto one or more of the components in the suspension or dispersion. Such components in the suspension or dispersion that the collector(s) absorbs onto can become more hydrophobic and more amenable to flotation relative to the other, non-absorbed component(s) in the suspension or dispersion.

Additives identified as "depressants" can be used in conjunction with collectors to render or retain the other, non-absorbed component(s) in the suspension or dispersion, i.e., less likely to float. For example, the components in the suspension or dispersion that the depressant(s) interact with can become less amenable to floatation relative to the other components in the suspension or dispersion, such as the components that the collector(s) absorb onto. Components in the suspension or dispersion that can be affected by the depressants can have a reduced tendency to be carried into the froth concentrate and more likely to remain in the underflow or tailings.

Since different materials or components in the suspension or dispersion can be affected differently by the "collector" and/or the "depressant," a degree of separation can be obtained by this process.

In addition to flotation, a number of other processes can be used for the separation of solid contaminants from liquid suspensions or dispersions. Similar to flotation these other processes can take advantage of additives that facilitate the desired separation, either by destabilizing the suspension or dispersion, or by otherwise causing contaminants in the suspension or dispersion to form larger agglomerates. Coagulation, for example, refers to the destabilization of suspended or dispersed solid particles, such as by neutralizing the electric charge that separates them from one another in the suspension or dispersion. Flocculation refers to the bridging or agglomeration of solid particles together into clumps or flocs, thereby facilitating their separation by settling, or flotation, depending on the density of the flocs relative to the liquid. Filtration could also be used to separate the larger clumps or flocs from the liquid.

Flocculants can be used, for example, for agglomerating clays suspended in a waste slurry effluent from phosphate production facilities, in coal slurry dewatering, for treating sewage to remove contaminants (e.g., sludge) via sedimentation, for processing of pulp and paper mill effluents to remove suspended cellulosic solids, for removing sand from aqueous bitumen-containing slurries generated in the extraction and subsequent processing of oil sands, and for removing suspended solid particulates in the purification of drinking (i.e., potable) water.

The foregoing descriptions are illustrative of specific examples where an aqueous liquid suspension or an aqueous dispersion is processed to recover, isolate, enrich, separate, and/or purify one or more materials or components contained in the suspension or dispersion. Such separations can also be used in a number of other water-consuming industries and the methods discussed above or elsewhere herein can be used in a wide variety of processes to recover, isolate, enrich, separate, and/or purify one or more materials or components from one or more unwanted contaminants. In another example, the methods discussed herein can also be used to remove one or more contaminants from a liquid, such as in water purification.

One or more cationic polymers can be used, either alone, or in combination with one or more anionic flocculants, e.g., anionic polymer flocculants, in a wide range of applications that can include, but are not limited to, a variety of separation processes, including flotation. The cationic polymers discussed and described herein, can be used as adjuvants to improve or enhance the performance of a wide variety of separation processes, such as the selective separation of a wide variety of solid contaminants from liquid suspensions and/or dispersions.

As used herein, the term "polymer" refers to molecules composed of repeating structural units of an aldehyde, of an optional aldehyde-reactive monomer, and of guanidine. The repeating structural units can be connected by covalent chemical bonds. The term "polymer" is not intended to imply any particular range of molecular weights and would encompass molecules commonly referred to as oligomers as well.

The cationic polymer can be a molecule that under an appropriate pH condition in an aqueous environment possesses a net cationic (positive) charge. In its solid state, the cationic polymer can be associated with a counter-ion and the counter-ion or anion can become disassociated from the polymer when the cationic polymer is introduced into an aqueous environment. When determining the weight percent of various monomers as a function of the cationic polymer, the cationic polymer is considered to be independent of the counter-ion. The presence of the cationic charge can be verified by ion-exchange chromatography and/or ionic polymer titrations used in such instruments as the Mütek PCD.

The cationic polymers can be formed by reacting an aldehyde with guanidine. In another example, the cationic polymers can be formed by reacting an aldehyde with guanidine and an optional aldehyde-reactive compound. The guanidine can be provided in an amount sufficient to provide the polymer with a net cationic charge.

The aldehyde can be or include formaldehyde. Any form of formaldehyde can be used. For example, paraformaldehyde or paraform (a solid, polymerized formaldehyde) and/or formalin solutions (aqueous solutions of formaldehyde, sometimes with methanol, in 37 wt %, 44 wt %, or 50 wt % formaldehyde concentrations). Formaldehyde gas can also be used. In at least one example, a low methanol-containing 50 wt % formaldehyde aqueous solution can be used. In another example, the formaldehyde substituted in part or in whole with substituted aldehydes such as acetaldehyde and/or propylaldehyde can be used as the source of formaldehyde. Other suitable aldehydes can also include aromatic aldehydes (e.g., benzylaldehyde and furfural), and other aldehydes such as aldol, glyoxal, and crotonaldehyde. Mixtures of aldehydes can also be used. Thus, as used herein, the term "formaldehyde" is not limited to formaldehyde, but also denotes the use of formaldehyde alternatives.

Guanidine ($H_2N$—$C(NH)$—$NH_2$) is a primary amine having at least two functional amine (amino) groups. Guanidine is reactive with formaldehyde and related aldehydes. Guanidine can introduce the cationic character to the polymer. Guanidine is an alkaline material. Guanidine has a $pK_a$ of about 12.5 and thus usually exits in an aqueous media as a charged cation except under alkaline or highly alkaline conditions. Guanidine can be used in the form of one of its salts such as guanidine carbonate, guanidine hydrogen chloride (guanidinium chloride), guanidine sulfate, guanidine nitrate, or any combination thereof. In one example, the guanidine carbonate salt can be used and the counter anion (carbonate) can be removed as carbon dioxide during the synthesis of the cationic polymer. As used herein, the term "guanidine" refers to not only the free base, but also any of its salt forms.

The guanidine can be provided for reaction with the aldehyde in an amount sufficient to provide the polymer with a net cationic charge. In another example, guanidine can be provided for reaction with the aldehyde and with the optional aldehyde-reactive compound in an amount sufficient to provide the polymer with a net cationic charge. The amount of guanidine provided can be sufficient so that on average each polymer molecule has at least one guanidine monomer unit. In another example, the amount of guanidine provided can be sufficient so that on average each cationic polymer molecule has at least 1, 2, 3, 4, 5, 6, 7, 8, 9, 10, or more guanidine monomer units. The mole ratio of the guanidine to the total amount of any optional aldehyde-reactive compound(s) that can be included the cationic polymer can be at least 1:99 or at least 10:90. There is no upper limit for the mole ratio of the guanidine to the total amount of any optional aldehyde-reactive compound(s) that include the cationic polymer, as forming the cationic polymer by reacting only guanidine and an aldehyde, such as formaldehyde is contemplated.

Formaldehyde is known to be reactive with a variety of compounds for making oligomeric and polymeric materials; often identified as resinous materials. As used herein, the term "aldehyde-reactive compound" and similar phrases is intended to include compounds that have at least two aldehyde reactive functional groups and are capable of reacting with formaldehyde and other similar aldehydes for making a polymer. The "aldehyde-reactive compounds" can include ammonia, primary amines, secondary amines, phenols compounds (e.g., phenolic compounds), and mixtures thereof. Even though formaldehyde is also reactive with guanidine (and a cationic copolymer formed by reaction between an aldehyde and guanidine alone is embraced in the present disclosure), for purpose of the present disclosure "guanidine" is expressly excluded from the definition of "aldehyde-reactive compound."

Ammonia is available in various gaseous and liquid forms, particularly including aqueous solutions at various concentrations. Any of these forms is suitable for use. Commercially-available aqueous ammonia-containing solutions typically containing between about 10 and 35 percent ammonia are available. For example, an aqueous solution containing about 28 percent ammonia can be used.

The primary and secondary amines can include compounds having at least two functional amine (amino) groups, or at least two functional amide groups, or amidine compounds having at least one of each of these groups. Such compounds can include ureas, other guanidine like compounds, and melamines, which can be substituted at their respective amine nitrogen atoms with aliphatic or aromatic radicals, wherein at least two nitrogen atoms are not completely substituted and thus are available for reaction with the aldehyde. In at least one example, one or more primary amines can be used. Other suitable amines can include primary alkylamines, alkanolamines, polyamines (e.g., alkyl primary diamines such as ethylene diamine and alkyl primary triamines such as diethylene triamine), polyalkanolamines, melamine or other amine-substituted triazines, dicyandiamide, substituted or cyclic ureas (e.g., ethylene urea), guanidine derivatives (e.g., cyanoguanidine and acetoguanidine), or any combination thereof.

Urea can be used as the optional aldehyde-reactive compound in producing a suitable cationic polymer. Solid urea, such as prill, and urea solutions, typically aqueous solutions, can be used. Further, urea can be combined with another moiety, most typically formaldehyde and urea-formaldehyde, often in aqueous solution. Any form of urea or urea in combination with formaldehyde can be used. Both urea prill and combined urea-formaldehyde products can be used, such as Urea Formaldehyde Concentrate ("UFC"), particularly UFC 85. These types of products are disclosed in, for example, U.S. Pat. Nos. 5,362,842 and 5,389,716.

Any suitable phenol or combination of phenols can be used. For example, phenol itself, i.e. hydroxybenzene can be used. In another example, phenol can be replaced, partially or totally, with other phenols that are un-substituted at the two ortho positions, or at one ortho and the para position. Thus, as used herein, the terms "phenol" and "phenols" can refer to phenol derivatives, as well as phenol itself. These unsubstituted positions can useful for the desired polymerization reaction(s) to occur with the aldehyde. Any one, all, or none of the remaining carbon atoms of the phenol ring can be substituted in a conventional fashion. The nature of the substituents can vary widely, preferably interference in the polymerization of the aldehyde with the phenols at the ortho and/or para positions is absent or minimal. Optional substituted phenols that can be used can include alkyl substituted phenols, aryl substituted phenols, cycloalkyl substituted phenols, alkenyl substituted phenols, alkoxy substituted phenols, aryloxy substituted phenols, and halogen substituted phenols, with the foregoing substituents having from 1 to about 26 carbon atoms or from 1 to about 9 carbon atoms. Phenol can also be replaced with natural phenolic compounds that can react with more than one equivalent of formaldehyde on a molar basis, such as tannins and/or lignin.

Other examples of suitable phenols (phenolic compounds) that can be used in preparing the cationic polymer of the present invention include: bis-phenol A, bis-phenol F, resorcinol, o-cresol, m-cresol, p-cresol, 3,5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5-dimethoxy phenol, 3,4,5 trimethoxy phenol, p-ethoxy phenol, p-butoxy phenol, 3-methyl-4-methoxy phenol, p-phenoxy phenol, naphthol, anthranol, catechol, phloroglucinol, catechins and substituted derivatives thereof.

Mixtures of the optional aldehyde-reactive compounds can also be used. For example, a mixture or combination of ammonia and urea as the optional aldehyde-reactive compound can be used. In another example, the optional aldehyde-reactive compound can include ammonia, urea, phenolic compounds, or mixtures thereof. For example, the optional aldehyde-reactive compound can include two or more of ammonia, urea, one or more primary amines, one or more secondary amines, and one or more phenol or phenolic compounds.

In one example, the cationic polymer can be a copolymer of an aldehyde (or a mixture of aldehydes) and guanidine. In another example, the cationic polymer can include at least a terpolymer of an aldehyde, e.g., formaldehyde, guanidine and an optional aldehyde-reactive compound, e.g., urea. In one or more embodiments, the guanidine monomer units can, on average, constitute at least 1% and up to about 58% by weight of the cationic polymer, from at least 3% and up to about 40% by weight of the cationic polymer, or from at least 5% up to about 10% by weight of the cationic polymer. For example, the amount of guanidine monomer units in the cationic polymer can, on average, range from a low of about 1%, about 4%, about 6%, or about 8% to a high of about 12%, about 15%, about 20%, about 25%, about 30%, about 35%, about 40%, or about 45% by weight of the cationic polymer. In another example, the guanidine monomer units can, on average, constitute about 5% to about 50% by weight of the cationic polymer, about 4% to about 15% by weight of the cationic polymer, or about 1% to about 55% by weight of the cationic polymer. In still another example, the guanidine monomer units in the cationic polymer can, on average, constitute at least 1% to about 50%, at least 2% to about 40%, at least 3% to about 30%, at least 2% to about 20%, or at least 4% to about 25% by weight of the cationic polymer. In yet another example, the guanidine monomer units in the cationic polymer can, on average, constitute at least 1%, at least 2%, at least 3%, or at least 4% and less than about 58%, less than about 55%, less than about 50%, less than about 45%, less than about 40%, less than about 35%, less than about 30%, less than about 25%, less than about 20%, or less than about 15% by weight of the cationic polymer.

Mole ratios between the aldehyde and the sum of guanidine and the optional aldehyde-reactive compound(s) can vary considerably depending on the specific reactants and/or their degree of functionality. The mole ratio of the moles aldehyde (F) to the sum of moles guanidine (G) and the moles of any aldehyde-reactive compound(s) (R), i.e. (F:(G+R)) can range from about 1:2 (alternatively designated as 0.5:1) to about 3:1. In another example, the mole ratio of the moles aldehyde (F) to the sum of moles guanidine (G) and the moles of the optional aldehyde-reactive compound(s) (R) can range from a low of about 1:3, about 1:2, about 1:1.5, or about 1:1 to a high of about 1.5:1, about 2:1, about 2.5:1, about 3:1, or about 3.5:1. For example, in the case of formaldehyde (F), guanidine (G) and urea (U), the mole ratio (F:(G+U)) can range from about 1:2 to about 3.5:1, about 1.5:1 to about 3:1, about 2:1 to about 3:1, about 2.5:1 to about 3:1, or about 1.5:1 to about 2.5:1. In another example, in the case of formaldehyde (F), guanidine (G) and phenol (P), the mole ratio of (F:(G+P)) can range from about 1:2.5 to about 3.5:1, about 1:2 to about 3:1, about 1:1.5 to about 2.5:1, about 1:1 to about 2:1, or about 1:1.5 to about 2.5:1. The mole ratio of the aldehyde to the sum of the optional aldehyde-reactive compound and the guanidine can be selected so that the cationic polymer that results from the chemical reactions has one or more desired properties, such as molecular weight, cationic content, solubility, and/or anionic polymer flocculant ability. Those skilled in the art of aldehyde chemistry can identify, if necessary, with the exercise of only routine experimentation, a suitable mole ratio to use when reacting an aldehyde, guanidine and an optional aldehyde-reactive compound.

The cationic polymer can be prepared by reacting the aldehyde, guanidine, and the optional aldehyde-reactive compound using a variety of approaches. For example, U.S. Pat. Nos. 1,658,597; 1,780,636; and 2,668,808, each of which is incorporated herein by reference, describe the condensation reaction that occurs between aldehydes, such as formaldehyde, and guanidine. As recognized by those skilled in the art, methods for synthesizing aldehyde polymers is ubiquitous in the prior art, and such prior art techniques are readily applied to the synthesis of the cationic polymer as discussed herein.

In the case of preparing a cationic polymer using formaldehyde, urea and guanidine, known procedures for reacting amines with formaldehyde can be used. For example, the guanidine to be used, e.g., guanidine carbonate, can simply be substituted for a portion of the urea during the synthesis. At a sufficiently high pH, it is possible for reactions to proceed essentially in the absence of condensation reactions. For example, the reaction mixture can be maintained at a pH typically from about 5.0 to about 10, or a pH that ranges from a low of about 5.0, about 5.6, or about 6.2 to a high of about 7.8, about 8.8, or about 10. If desired, an acid, such as sulfuric acid or acetic acid, can be used to control the pH and accordingly the rate of condensation (which ultimately determines the molecular weight of the condensed polymer). Reaction temperatures can range from about 30° C. to about 100° C., and typically can be about 95° C., though use of the reflux temperature can be suitable in some circumstances. A reaction time from about 15 minutes to about 3 hours or from about 30 minutes to about 2 hours can be used.

The reaction can be conducted in an aqueous solution. Water can provide a suitable way (heat sink) for controlling exothermic reactions. Reaction conducted in an aqueous solution, can include an amount of water sufficient to limit the reactants to not more than 80% of the weight of the reaction mixture. For example, an aqueous reaction mixture can include an amount of water sufficient such that the reactants make up about 10% to about 80% of the weight of the reaction mixture, from about 20% to about 70% of the weight of the reaction mixture, or from about 20% to about 65% of the weight of the reaction mixture. Accordingly, the cationic polymer can be produced as an aqueous mixture containing no more than 80% by weight solids, between about 20% and about 70% by weight solids, between about 20% and about 65% by weight solids, or between about 20% and about 60% by weight solids. In another example, the cationic polymer can be produced as an aqueous mixture having an amount of solids ranging from a low of about 10%, about 20%, about 30%, or about 40% to a high of about 60%, about 65%, about 70%, or about 75% by weight.

The reaction can be conducted to a specific viscosity endpoint in order to facilitate subsequent handling of the cationic polymer. For example, the reaction can be allowed to progress until the aqueous reaction system reaches a viscosity of no higher than H on the Gardner-Holt scale or a viscosity no higher than G on the Gardner-Holt scale.

The aqueous solution of the cationic polymer can then be used directly in its liquid form or it can be further diluted before use, for enhancing or for facilitating a particular solids-liquid separation process. In another example, the cationic polymer could be isolated as a particulate solid, for example by spray drying, or by freeze drying the aqueous reaction mixture before use in a particular solids-liquid separation process. Isolating the cationic polymer in the form of a particulate solid also facilitates its storage, handling, and shipment. Aqueous preparations then could be reconstituted from the particulate solids as desired.

The cationic polymer can be used as a separation aide in a variety of processes. The cationic polymer can provide useful or effective results at economical dosage levels. For example, the cationic polymer can be used as a separation aide in an amount ranging from about 10 ppm to about 300 ppm (e.g., 10 g to 300 g of cationic polymer per metric ton of solids in the system). Treatment dosages can range from about 10 ppm and about 2,500 ppm, from about 10 ppm to about 1,000 ppm, or from about 10 ppm to about 500 ppm. In another example, the amount of cationic polymer can range from a low of about 5 ppm, about 10 ppm, about 20 ppm, or about 50 ppm to a high of about 500 ppm, about 1,000 ppm, about 1,500 ppm, or about 2,000 ppm. In some examples, an excessive amount of the cationic polymer could possibly lead to a reduction in the effectiveness of the separation.

In many applications, the cationic polymer can function as a depressant causing an anionic constituent in an aqueous system to be recovered as a bottoms or tailings in a froth flotation process. In other applications, such as when used in combination with an anionic flocculant as described below, the cationic polymer assists in the formation of flocs that can be removed from the aqueous system using one of a wide variety of solid-liquid separation techniques, such as clarification (gravity assisted sedimentation), centrifugation, filtration and the like.

Referring now to the FIGURE, the FIGURE depicts a schematic of an illustrative froth flotation process 100 in which one or more materials can be separated in a first (froth flotation) stage 10 from at least a portion of one or more impurities, and in which the so-separated impurities can be concentrated in a second thickening stage 20, according to one or more embodiments. For example, the froth flotation process 100 can be used to separate materials such as minerals or ores (e.g., phosphorous and potassium), metal ores (e.g., platinum group elements), high molecular weight hydrocarbons such as bitumen from sand and/or clay, or coal ore, to produce a purified product having a reduced amount of contaminants as compared to prior to treatment of the untreated material. In another example, a clay-containing ore having one or more impurities or contaminants can be treated to provide a purified clay containing a reduced amount of at least one contaminant relative to the clay-containing ore prior to treatment. In still another example a coal-ore having one or more impurities or contaminants can be treated to provide a purified coal containing a reduced amount of at least one contaminant relative to the coal-ore.

Illustrative minerals or metal ores can include, but are not limited to, phosphate, lime, sulfate, gypsum, iron, platinum, gold, palladium, titanium, molybdenum, copper, uranium, chromium, tungsten, manganese, magnesium, lead, zinc, clay, coal, silver, graphite, nickel, bauxite, borax, borate, calcium carbonate, or any combination thereof. Illustrative contaminants that can be contained in the clay-containing ore can include, but are not limited to, metals, metal oxides, and minerals. Illustrative contaminants that can be contained in the coal-ore can include, but are not limited to, mercury, nitrogen, sulfur, silicon, ash, and pyrite, or and combination thereof.

In the case of solid ore beneficiation, the use of flotation can include grinding the crude ore into sufficiently small, discrete particles and then contacting an aqueous, usually pre-conditioned "pulp" of this ground ore with rising air bubbles, typically while agitating the pulp. Prior to flotation, the crude ore can be subjected to any number of preconditioning steps, including selective crushing, screening, desliming, gravity concentration, electrical separation, low temperature roasting, magnetic differentiation, or any combination thereof.

An aqueous slurry containing solids via line 1 can be introduced to the froth flotation stage 10. For example, an aqueous slurry of ground ore can be introduced via line 1 into the froth flotation stage 10. The cationic polymer via line 2 can be introduced to the froth flotation stage 10. The froth flotation stage 10 can include one or more operations in the context of a mineral beneficiation process. For example, the froth flotation stage 10 can include one or more flotation cells that could be used for carrying out the contacting of an aqueous "pulp" of the ground ore with rising air bubbles. The froth flotation stage 10 can separate one or more desirable solids (e.g., ore) from one or more less desirable solids or gangue to provide a purified product via line 3 and a contaminant-rich product via line 4. In other words the froth flotation stage 10 can provide a purified product via line 3 having a reduced amount of at least one contaminant relative to the aqueous slurry containing solids introduced via line 1 to the froth flotation stage 10.

In another example, in the case of a phosphate recovery process, the froth flotation stage 10 can, in addition to one or more flotation cells, also include a combination of initial conditioning steps for the feed in line 1, where the ore can be conditioned with a collector and/or a depressing agent (not shown). The collector and/or depressing agent(s) can coat the phosphate particles enhancing their ability to float in the one or more flotation cells. The cationic polymer via line 2 can be introduced to the froth flotation stage 10. In this process, the cationic polymer can initially act as a depressing agent helping to cause undesired silica in the ore slurry to sink. The float (in this case phosphorus) via line 3 can be recovered from the froth flotation stage 10. The recovered float in line 3 can be further processed and/or used as recovered. The silica via line 4 can be sent to the thickening stage 20.

In order to enhance the concentration of the silica and the recovery of process water via line 6, suitable for discharge or further use, one or more anionic flocculants via line 5 can be introduced to the thickening stage 20. At least a portion of the cationic polymer introduced via line 2 to the froth flotation stage 10 can also enter the thickening station with the silica via in line 4. For example, at least a portion of the cationic polymer can become associated with the silica in the froth flotation stage 10. In the thickening stage 20, the cationic polymer can function in combination with the anionic flocculant introduced via line 5 to enhance or improve the concentration and separation of the silica in the thickening station 20. The thickened silica can be recovered via line 7 from the thickening stage 20. The process water can be recovered via line 6 from the thickening stage 20.

Use of one or more anionic flocculants in combination with the cationic polymer can enhance the separation of charged materials from an aqueous media. A wide variety of separations can benefit from employing such adjuvants in combination. The specific nature of any particular separation application can influence whether the aqueous solution or slurry is treated first with an anionic flocculant or is treated first with the cationic polymer. For example, if the material intended to be removed is predominantly cationic in nature, it can be preferable to treat with the anionic flocculant before treating with the cationic polymer. Conversely, if the material intended to be removed is predominantly anionic in nature, it can be preferable to treat with the cationic polymer before treating with the anionic flocculant. In another example, a material intended to be removed that is predominantly anionic or cationic in nature can be simultaneously treated with both the anionic flocculant and the cationic polymer.

For example, water containing a metallic cation can be first treated with an anionic flocculant and then treated with the cationic polymer. After treating the water, at least a portion of the metallic cation can be removed by filtration to yield purified water. In another example, water containing the metallic cation can be simultaneously treated with both the anionic flocculant and the cationic polymer and at least a portion of the metallic cation can then be removed to produce purified water. In still another example, water containing the metallic cation can be first treated with the cationic polymer and then treated with the anionic flocculant. After treating the water, at least a portion of the metallic cation can be removed by filtration to yield purified water.

Any of the wide variety of available anionic flocculants can be suitable for use in combination with the cationic polymer. Anionic flocculants are typically polymeric materials characterized by having carboxyl or sulfate functional groups that cause the polymer molecule to have a net anionic (negative) charge under suitable pH conditions in an aqueous environment. Suitable anionic flocculants can include, but are not limited to, polyacrylamides, copolymers of polyacrylamide and/or acrylic acid, polyacrylates, acrylonitrites, N-substituted acrylamides, sulfonated polystyrene, sulfonated polyethyleneimine, carboxymethylcelluloses, anionic starches, sulfonated urea-formaldehyde (UF) resins, sulfonated melamine-formaldehyde (MF) resins, sulfonated phenol-formaldehyde (PF) resins, styrene-maleic anhydride polymers, lignosulfonates, humic acids, tannic acids, and mixtures thereof. Suitable anionic flocculants may also include modestly large anionic molecules that are not technically polymers, such as sulfated castor oil, sodium dodecylsulfonate, adipic acid, azuleic acid, and mixtures thereof.

Anionic flocculants can be used at dosage levels in the range of about 5 ppm to about 100 ppm (e.g., 5 g to 100 g of anionic flocculant solids per metric ton of solids in the aqueous system). In another example, treatment dosages of anionic flocculant can range from about 5 ppm to about 2,500 ppm, about 5 ppm to about 1,000 ppm, or from about 5 ppm to about 300 ppm. In another example, the amount of anionic flocculant can range from a low of about 5 ppm, about 10 ppm, about 20 ppm, or about 50 ppm to a high of about 500 ppm, about 1,000 ppm, about 1,500 ppm, or about 2,000 ppm. In some cases, the use of an excessive amount of the anionic flocculant can lead to a reduction in the effectiveness of the separation.

Additionally, U.S. Patent Application Publications Nos.: 2006/0151360; 2007/0000839; and 2008/0017552, each of which is incorporated by reference in its entirety, describe the use of certain modified base resins for use in solid/liquid separation processes, where the base resin comprises a reaction product of a primary or a secondary amine and an aldehyde, and wherein the base resin is modified with a coupling agent. As described therein, one preferred class of coupling agent is substituted silanes, which possess both a base resin-reactive group (e.g., an organofunctional group) and a second group (e.g., a trimethoxysilane group) that is capable of adhering to, or interacting with, unwanted impurities (especially siliceous materials) present in the aqueous media of a particular separation process. In one or more embodiments, the cationic polymer can be modified in the same manner as taught in these prior publications for enhancing the performance of the polymer in particular separation applications. As such, the cationic polymer can include coupling agent-modified cationic polymers.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example 1

Preparation of a Cationic Polymer

UFC 85 (42.8 parts by weight ("pbw")) and a 50% by weight aqueous formaldehyde solution (21.2 pbw) were added to a suitable reactor. The temperature of the aqueous mixture was adjusted to 50° C., mixing was initiated and maintained throughout the remainder of the process. Then, 0.22 pbw of an 8% by weight aqueous sulfuric acid solution was added, followed by 12.8 pbw of a 28% by weight aqueous solution of ammonia. An exothermic reaction caused the temperature to increase and with additional heating the temperature was increased to about 80° C., held at that temperature for five (5) minutes and then cooled to a temperature of 60° C. After cooling, 17.6 pbw of prilled urea was added, along with 4.7 pbw of guanidine carbonate. The pH of the reaction mixture was about 10. An exothermic reaction caused the temperature to increase and with additional heating the temperature was increased to about 97° C. The reaction was continued at this temperature. The extent of the reaction was monitored by periodically measuring viscosity. The viscosity was measured to be between A1 and A2 on Gardner-Holt scale at that point.

An additional 0.45 pbw of 8% by weight sulfuric acid was added, but because the viscosity was still low, it was followed by two separate additions of 3.3 pbw each of a 20% by weight solution of sulfuric acid about 30 minutes later. Another two charges of sulfuric acid (20% by weight solution) constituting 0.33 pbw and 0.57 pbw, were then made; the final charge occurring about 2.5 hours after the synthesis began. At this point the pH of the reaction mixture was about 5 and the viscosity is approximately G on the Gardner-Holt scale. The reaction mixture was then cooled to about 80° C. A 50% by weight aqueous solution of sodium hydroxide was added (0.03 pbw) and the reaction mixture was vacuum distilled to yield (about 3 hours after the start of the synthesis) a cationic polymer solution that had a Brookfield viscosity (25° C.) of 433 cps and a percent solids content of about 60% by weight. The water dilute of the aqueous cationic polymer product should be greater than 10 to 1. The Brookfield viscosity was measured at 25° C. using a Digital Viscometer with a small sample adapter (Model DV-II) at 50 rpms.

Example 2

Preparation of a Cationic Polymer

UFC 85 (42.2 pbw) and a 50% by weight aqueous formaldehyde solution (20.8 pbw) were added to a suitable reactor. The temperature of the aqueous mixture was adjusted to about 50° C., mixing was initiated and maintained throughout the remainder of the process. Then, 0.21 pbw of an 8% by weight aqueous sulfuric acid solution was added, followed by 12.6 pbw of a 28% by weight aqueous solution of ammonia. An exothermic reaction caused the temperature to increase and with additional heating the temperature was increased to about 80° C., held at that temperature for five (5) minutes and then cooled to a temperature of about 60° C. At this point, 14.2 pbw of prilled urea was added, along with 9.3 pbw of guanidine carbonate. The pH of the reaction mixture was about 11. An exothermic reaction caused the temperature to increase and with additional heating the temperature was increased to about 97° C. The reaction was continued at this temperature. The extent of the reaction was monitored by periodically measuring viscosity.

Three separate additions of a 20% by weight solution of sulfuric acid, 3.33, 3.46, and 3.59 pbw, respectively, were added at 2-3 minute intervals. The reaction was then held for 30 minutes during which the viscosity was found to be A1-A2 on the Gardner-Holt scale. The viscosity was still low, so an additional charge of a 20% by weight solution of sulfuric acid, 6.9 pbw was added. After an additional 30 minutes, the reaction mixture was found to be above a Gardner-Holt viscosity of G and was cooled to about 75° C. and then a 1.33 pbw of a 50% by weight aqueous solution of sodium hydroxide was added. Thereafter, the reaction mixture was vacuum distilled (about 2.4 hours after the start of the synthesis) to yield a cationic polymer solution that had a Brookfield viscosity (25° C.) of 570 cps and a percent solids content of about 54% by weight. The Brookfield viscosity was measured at 25° C. using a Digital Viscometer with a small sample adapter (Model DV-II) at 12 rpms.

Example 3

Comparative Testing of Example 1 and Example 2 as Coagulants

Three one liter samples of a coal-preparation plant thickener feed (measured at 3.5% solids) contained in a graduated cylinder were separately treated with various levels of a cationic coagulant (the cationic polymer of Example 1, the cationic polymer of Example 2, and a commercially available polyDADMAC, i.e., Zetag® 7122) and subsequently with a fixed concentration of an anionic flocculant (Magnafloc® 336).

Following each treatment, the turbidity front was allowed to settle to half of the height of the graduated cylinder. The settling rate was then calculated as the distance fallen divided by the elapsed time. The supernatant solution was sampled with a pipette and approximately 500 ml was introduced to a "clarity wedge" (see <<"http://www.enviroscopics.com/Wedge.htm">>) where the clarity was assessed on a scale of from 1 to 46, with 1 being the most turbid and 46 being the most clear and was determined by the ease of distinguishing the number "46" through 20 cm of the sample fluid.

Each of the cationic coagulants (Example 1, Example 2, and Zetag® 7122 polyDADMAC) were diluted from their original concentrations by a factor of 100 before being used in the experiments. The Magnafloc® 336 anionic flocculant polymer was diluted form its original concentration by a factor of 500 and 2 ml of the diluted material was used in the testing.

The testing results are presented in Table 1.

TABLE 1

| | 5 ml Dose | | 10 ml Dose | | 15 ml Dose | |
|---|---|---|---|---|---|---|
| | Setting Rate (in/min) | Clarity | Setting Rate (in/min) | Clarity | Setting Rate (in/min) | Clarity |
| Ex. 1 | 6 | 18 | 10 | 32 | 12 | 40 |
| Ex. 2 | 5 | 15 | 9 | 30 | 10 | 38 |
| Zetag | 8 | 20 | 12 | 30 | 14 | 46 |

Example 4

Comparative Testing of Example 1 and Example 2 as Coagulants

Three one liter samples of a coal-preparation plant thickener feed (measured at 3.5% solids) contained in a graduated cylinder were separately treated with a fixed concentration of an anionic flocculant (Magnafloc® 336) and then separately treated with various levels of a cationic coagulant (the cationic polymer of Example 1, the cationic polymer of Example 2, and a commercially available polyDADMAC, i.e., Zetag® 7122).

Following each treatment, the turbidity front was allowed to settle to half of the height of the graduated cylinder. The settling rate then was calculated as the distance fallen divided by the elapsed time. The supernatant solution was sampled with a pipette and approximately 500 ml was introduced to a "clarity wedge" (see <<"http://www.enviroscopics.com/Wedge.htm">>) where the clarity was assessed on a scale of from 1 to 46, with 1 being the most turbid and 46 being the most clear and was determined by the ease of distinguishing the number "46" through 20 cm of the sample fluid.

Each of the cationic coagulants (Example 1, Example 2, and Zetag® 7122 polyDADMAC) were diluted from their original concentrations by a factor of 100 before being used in the experiments. The Magnafloc® 336 anionic flocculant polymer was diluted form its original concentration by a factor of 500 and 2 ml of the diluted material was used in the testing.

The testing results are presented in Table 2.

TABLE 2

| | 2 ml Dose | | 3 ml Dose | | 5 ml Dose | |
|---|---|---|---|---|---|---|
| | Setting Rate (in/min) | Clarity | Setting Rate (in/min) | Clarity | Setting Rate (in/min) | Clarity |
| Ex. 1 | 10 | 22 | 12 | 38 | 14 | 46 |
| Ex. 2 | 9 | 20 | 11 | 37 | 13 | 46 |
| Zetag | 4 | 2 | 5 | 6 | 7 | 10 |

Example 5

Using Example 1 and Example 2 as Clay Depressants

A slurry of 5% by weight clay solids (Montmorillonite K-10 purchased from Sigma-Aldrich) in deionized water was prepared in three separate 250 ml graduated cylinders. To each of the cylinders, sufficient polymer solution was added to approximate a 200 ppm concentration of polymer solids and the slurry was agitated by placing a gloved hand over the mouth of the cylinder and inverting and shaking until homogeneity was achieved as judged by visual inspection. One of the three graduated cylinders had no polymer added, but was otherwise agitated the same. The other two cylinders were dosed with the Example 1 polymer (0.1 ml of undiluted resin) and with the Example 2 polymer (0.15 ml undiluted resin), respectively. The dosed solutions typically formed a "settling front" where an opaque slurry remained below the front and clearer liquid above the front, with the front moving downwardly over time. The front typically stops at some volume, in our case approximately at 20% of the column height. The heights were assessed from digital photos of the experimental setup. The extent of settling reported in centimeters as a function of time for each test is listed in Table 3.

TABLE 3

|  | 5 min. | 10 min. | 15 min. | 30 min. |
| --- | --- | --- | --- | --- |
| No Additive | 1* | 2* | 2* | 3* |
| Example 1 | 11 | 19 | 20 | 20 |
| Example 2 | 8* | 14* | 20* | 20* |

*The supernatant was observed as having modest turbidity as compared to pure water.

Example 6

Using Example 1 and Example 2 as Clay Depressants

A slurry of 5% by weight clay solids (Montmorillonite K-10 purchased from Sigma-Aldrich) in deionized water was prepared in three separate 250 ml graduated cylinders. To each of the cylinders was added 2 ml of a pH 7 buffer made by combining 43.8 grams of K2HPO4, 34.9 grams of $KH_2PO_4$ and 221.32 grams of water. To each of the cylinders sufficient polymer solution was also added to approximate a 200 ppm concentration of polymer solids and the slurry was agitated by placing a gloved hand over the mouth of the cylinder and inverting and shaking until homogeneity was achieved as judged by visual inspection. One of the three graduated cylinders had no polymer added, but was otherwise agitated the same. The other two cylinders were dosed with the Example 1 polymer (0.1 ml of undiluted resin) and with the Example 2 polymer (0.15 ml undiluted resin), respectively. The dosed solutions typically formed a "settling front" where an opaque slurry remained below the front and clearer liquid above the front, with the front moving downwardly over time. The front typically stops at some volume, in our case approximately at 20% of the column height. The heights were assessed from digital photos of the experimental setup. The extent of settling reported in centimeters as a function of time for each test is listed in Table 4.

TABLE 4

|  | 5 min. | 10 min. | 15 min. | 30 min. |
| --- | --- | --- | --- | --- |
| No Additive | 1* | 2* | 2* | 3* |
| Example 1 | 16 | 19 | 20 | 21 |
| Example 2 | 9* | 14* | 18* | 21* |

*The supernatant was observed as having modest turbidity as compared to pure water.

Example 7

Using Example 1 and Example 2 as Clay Depressants

A slurry of 5% by weight particulate solids (Talc Powder (<10 microns) purchased from Sigma-Aldrich) in deionized water was prepared in three separate 250 ml graduated cylinders. To each of the cylinders was added 2 ml of a pH 7 buffer made by combining 43.8 grams of $K_2HPO_4$, 34.9 grams of KH2PO4 and 221.32 grams of water. To each of the cylinders sufficient polymer solution was also added to approximate a 200 ppm concentration of polymer solids and the slurry was agitated by placing a gloved hand over the mouth of the cylinder and inverting and shaking until homogeneity was achieved as judged by visual inspection. One of the three graduated cylinders had no polymer added, but was otherwise agitated the same. The other two cylinders were dosed with the Example 1 polymer (0.1 ml of undiluted resin) and with the Example 2 polymer (0.15 ml undiluted resin), respectively. The dosed solutions typically formed a "settling front" where an opaque slurry remained below the front and clearer liquid above the front, with the front moving downwardly over time. The front typically stops at some volume, in our case approximately at 20% of the column height. The heights were assessed from digital photos of the experimental setup. The extent of settling reported in centimeters as a function of time for each test is listed in Table 5.

TABLE 5

|  | 5 min. | 10 min. | 15 min. |
| --- | --- | --- | --- |
| No Additive | 0 | 0 | 0 |
| Example 1 | 9 | 15 | 16 |
| Example 2 | 4* | 8* | 11* |

*The supernatant was observed as having modest turbidity as compared to pure water.

Example 8

Preparation of a Cationic Polymer

Water (19.6 pbw) and guanidine carbonate (3.8 pbw) were added to a suitable reactor and agitated. 35% sulfuric acid (5.9 pbw) was slowly added and the mixture was stirred until effervescence subsided. If necessary, the pH of the reaction mixture was adjusted to a pH between 4 and 8 with 50% caustic. Then, 40.0 pbw of a urea-formaldehyde concentrate (UFC 85) was added to the reaction mixture. The urea formaldehyde concentrate itself was comprised of 25% urea, 60% formaldehyde, and 15% water. The addition of the UFC was followed by separate charges of a 28% aqueous solution of ammonia (11.4 pbw), and a 39% solution of ammonium sulfate (5.6 pbw). The reaction mixture was allowed to exotherm to 63° C. and was held at that temperature for at least 5 minutes. A charge of solid urea prills (12.7 pbw) was then added. The temperature decreased due to endothermic dissolution of the urea charge, but the reactor as then heated to 92° C. At this temperature, the reaction mixture was held until an in-hand Gardner-Holt viscosity of D (100 cP) was achieved, which often can take approximately 90 minutes to achieve. Then, the resulting reaction mixture (cationic polymer) was cooled to room temperature, and during cooling a final charge of a 28% aqueous solution of ammonia (1.0 pbw) was added. The final non-volatile solids content of the polymer was about 45%, its Brookfield viscosity was about 70 cP, and its pH was between about 9 and 9.5.

Embodiments of the present invention can further relate to any one or more of the following paragraphs:

1. A method for separating charged material from an aqueous medium, comprising contacting the aqueous medium with a cationic polymer, wherein the cationic polymer comprises a polymer formed by reacting an aldehyde, and optionally an aldehyde-reactive compound, in the presence of a sufficient amount of guanidine to provide the polymer with a net cationic charge.

2. A method for separating charged material from an aqueous medium, comprising sequentially treating the aqueous medium with a cationic polymer and with an anionic flocculant, wherein the cationic polymer comprises a polymer formed by reacting an aldehyde, and optionally an aldehyde-reactive compound, in the presence of a sufficient amount of guanidine to provide the polymer with a net cationic charge.

3. The method according to paragraph 1 or 2, wherein the aldehyde is formaldehyde.

4. The method according to any of paragraph 1 to 3, wherein the aldehyde is reacted with guanidine and with an aldehyde-reactive compound.

5. The method according to any of paragraphs 1 to 4, wherein the aldehyde-reactive compound is selected from the group consisting of ammonia, primary amines, secondary amines, phenol compounds and mixtures thereof.

6. The method according to any of paragraphs 1 to 4, wherein the aldehyde-reactive compound is selected from the group consisting of ammonia, urea, phenolic compounds and mixtures thereof.

7. The method according to any of paragraphs 1 to 6, wherein the cationic polymer is modified with a coupling agent.

8. The method according to any of paragraphs 2 to 7, wherein the anionic flocculant is selected from the group consisting of polyacrylamides, copolymers of polyacrylamide and acrylic acid, polyacrylates, acrylonitrites, N-substituted acrylamides, sulfonated polystyrene, sulfonated polyethyleneimine, carboxymethylcelluloses, anionic starches, sulfonated urea-formaldehyde resins, sulfonated melamine-formaldehyde resins, sulfonated phenol-formaldehyde resins, sulfonated urea-melamine-formaldehyde resins, styrene-maleic anhydride polymers, lignosulfonates, humic acids, tannic acids, sulfated castor oil, sodium docecylsulfonate, adipic acid, azuleic acid and mixtures thereof.

9. The method according to any of paragraphs 1 to 8, wherein monomer units of the guanidine, on average, constitute at least 1% and up to about 58% by weight of the cationic polymer.

10. The method according to any of paragraphs 1 to 9, wherein monomer units of the guanidine, on average, constitute at least 3% and up to about 40% by weight of the cationic polymer.

11. The method according to any of paragraphs 1 to 10, wherein the aldehyde (F) is provided in an amount relative to the sum of guanidine (G) and any aldehyde-reactive compound (R), sufficient to provide a mole ratio of (F:(G+R)) in a range of 1:2 to 3:1.

12. A method for purifying clay from a clay-containing ore that includes one or more contaminants selected from the group consisting of metals, metal oxides, and minerals, comprising treating a slurry of the clay-containing ore with a cationic polymer, wherein the cationic polymer comprises a polymer formed by reacting an aldehyde with guanidine and optionally with an aldehyde-reactive compound, where the guanidine is provided in an amount sufficient to provide the polymer with a net cationic charge; and recovering, by froth flotation at least a portion of one of the contaminants, either after or during treating the slurry of the clay-containing ore, a purified clay having a reduced amount of the at least one of the contaminants.

13. A method for purifying bitumen from a bitumen-containing slurry that include sand, clay, or a combination thereof, comprising treating the bitumen-containing slurry with a cationic polymer, wherein the cationic polymer comprises a polymer formed by reacting an aldehyde with guanidine and optionally with an aldehyde-reactive compound, where the guanidine is provided in an amount sufficient to provide the polymer with a net cationic charge; and recovering, by froth flotation, either after or during treating the bitumen-containing slurry, a purified bitumen having a reduced amount of sand or clay.

14. A method for purifying an aqueous liquid suspension comprising a solid contaminant, comprising treating the liquid suspension with a cationic polymer, wherein the cationic polymer comprises a polymer formed by reacting an aldehyde with guanidine and optionally with an aldehyde-reactive compound, where the guanidine is provided in an amount sufficient to provide the polymer with a net cationic charge; and removing, either after or during treating the liquid suspension, at least a portion of said solid contaminant in a contaminant-rich fraction, a purified liquid, or both.

15. A method for purifying water comprising a metallic cation, comprising treating the water with a combination of an anionic flocculant and a cationic polymer, wherein the cationic polymer comprises a polymer formed by reacting an aldehyde with guanidine and optionally with an aldehyde-reactive compound, where the guanidine is provided in an amount sufficient to provide the polymer with a net cationic charge; and removing at least a portion of the metallic cation by filtration to yield purified water.

16. A method for beneficiation of an ore, comprising treating a slurry of the ore with a cationic polymer, wherein the cationic polymer comprises a polymer formed by reacting an aldehyde with guanidine and optionally with an aldehyde-reactive compound, where the guanidine is provided in an amount sufficient to provide the polymer with a net cationic charge, wherein the ore comprises one or more minerals selected from the group consisting of phosphate, lime, sulfate, gypsum, iron, platinum, gold, palladium, titanium, molybdenum, copper, uranium, chromium, tungsten, manganese, magnesium, lead, zinc, clay, coal, silver, graphite, nickel, bauxite, borax, borate, and calcium carbonate.

17. A method for purifying a coal ore, comprising treating an aqueous slurry of the coal ore with a cationic polymer, wherein the cationic polymer can include a polymer formed by reacting an aldehyde with guanidine and optionally with an aldehyde-reactive compound, where the guanidine is provided in an amount sufficient to provide the polymer with a net cationic charge, wherein treating the aqueous slurry occurs prior to or during a size or density classification operation which recovers from the coal ore, purified coal having, relative to said coal ore, a reduced amount of an impurity selected from the group consisting of mercury, nitrogen, sulfur, silicon, ash, and pyrite, where the impurity is measured on a volatile free weight basis.

18. The method according to any of paragraphs 12 to 17, wherein the aldehyde is formaldehyde.

19. The method according to any of paragraphs 12 to 18, wherein the aldehyde is reacted with guanidine and with an aldehyde-reactive compound.

20. The method according to any of paragraphs 12 to 19, wherein the aldehyde-reactive compound is selected from the group consisting of ammonia, primary amines, secondary amines, phenols, and mixtures thereof.

21. The method according to any of paragraphs 12 to 19, wherein the aldehyde-reactive compound is selected from the group consisting of ammonia, urea, phenol and mixtures thereof.

22. The method according to any of paragraphs 12 to 21, wherein the cationic polymer is modified with a coupling agent.

23. The method according to paragraph 15, wherein the anionic flocculant is selected from the group consisting of polyacrylamides, copolymers of polyacrylamide and acrylic acid, polyacrylates, acrylonitrites, N-substituted acrylamides, sulfonated polystyrene, sulfonated polyethyleneimine, carboxymethylcelluloses, anionic starches, sulfonated urea-formaldehyde resins, sulfonated melamine-formaldehyde resins, sulfonated phenol-formaldehyde resins, sulfonated urea-melamine-formaldehyde resins, styrene-maleic anhydride polymers, lignosulfonates, humic acids, tannic acids, sulfated castor oil, sodium docecylsulfonate, adipic acid, azuleic acid and mixtures thereof.

24. The method according to any of paragraphs 12 to 23, wherein monomer units of the guanidine, on average, constitute at least 1% and up to about 58% by weight of the cationic polymer.

25. The method according to any of paragraphs 12 to 24, wherein monomer units of the guanidine, on average, constitute at least 3% and up to about 40% by weight of the cationic polymer.

26. The method according to any of paragraphs 12 to 23, wherein the aldehyde (F) is provided in an amount relative to the sum of guanidine (G) and any aldehyde-reactive compound (R), sufficient to provide a mole ratio of (F:(G+R)) in a range of 1:2 to 3:1.

The present invention has been described with reference to specific embodiments. However, this application is intended to cover those changes and substitutions that may be made by those skilled in the art without departing from the spirit and the scope of the invention. For example, the cationic polymers of the present invention also can be employed in combination with conventional water treatment additives such as other organic and/or inorganic coagulants, flocculants and antiforming agents.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art. Throughout the specification and in the claims the term "about" can encompass + or −5%.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for separating negatively charged material from an aqueous slurry, comprising:
    reacting a monomer mixture comprising one or more aldehydes, one or more phenolic compounds, and a sufficient amount of a guanidine salt to form a polymer having a net cationic charge, wherein the one or more aldehydes comprise formaldehyde, wherein the guanidine salt comprises guanidine carbonate, guanidine chloride, guanidine nitrate, or any mixture thereof, and wherein the monomer mixture is reacted at a temperature of about 30° C. to about 100° C. for a time period of about 15 minutes to about 3 hours to form the polymer having the net cationic charge;
    contacting an aqueous slurry comprising a negatively charged material with the polymer having the net cationic charge; and
    separating the negatively charged material from the aqueous slurry, wherein the negatively charged material has a reduced concentration of at least one other material relative to the aqueous slurry.

2. The method of claim 1 wherein the monomer mixture further comprises an aldehyde-reactive compound.

3. The method of claim 2 wherein the aldehyde-reactive compound is selected from the group consisting of ammonia, urea, and a mixture thereof.

4. The method of claim 1 wherein the polymer is further modified with a coupling agent.

5. The method of claim 1 wherein monomer units of the guanidine salt constitute at least 1 wt % and up to about 58 wt % of the polymer.

6. The method of claim 1 wherein the formaldehyde (F) is provided in an amount, relative to the sum of the guanidine salt (G) and the one or more phenolic compounds (R), sufficient to provide a mole ratio of (F:(G+R)) of 1:2 to 3:1.

7. The method of claim 1 wherein the negatively charged material comprises clay.

8. The method of claim 1 further comprising:
    recovering the negatively charged material from the aqueous slurry to provide a recovered product and a second aqueous slurry; and
    contacting the second aqueous slurry with a polymer having a net anionic charge after the negatively charged material is recovered from the aqueous slurry.

9. A method for separating negatively charged material from an aqueous slurry, comprising:
    reacting a monomer mixture comprising formaldehyde and a guanidine salt to form a polymer having a net cationic charge, wherein the monomer mixture is reacted at a temperature of about 30° C. to about 100° C. for a time period of about 15 minutes to about 3 hours to form the polymer having the net cationic charge, and wherein the guanidine salt comprises guanidine carbonate, guanidine chloride, guanidine nitrate, or any mixture thereof;

sequentially treating an aqueous slurry comprising a negatively charged material with the polymer having the net cationic charge and an anionic flocculant; and separating the negatively charged material from the aqueous slurry, wherein the negatively charged material has a reduced concentration of at least one other material relative to the aqueous slurry.

10. The method of claim 9 wherein the guanidine salt comprises guanidine carbonate, and wherein monomer units of the guanidine salt constitute at least 2 wt % to about 40 wt % of the polymer.

11. The method of claim 10 wherein the monomer mixture further comprises an aldehyde-reactive compound selected from the group consisting of: ammonia, primary amines, secondary amines, phenolic compounds, and mixtures thereof.

12. The method of claim 11 wherein the formaldehyde (F) is provided in an amount, relative to the sum of the guanidine salt (G) and the aldehyde-reactive compound (R), sufficient to provide a mole ratio of (F:(G+R)) of 1:2 to 3:1.

13. The method of claim 9 wherein the polymer is further modified with a coupling agent.

14. The method of claim 9 wherein the anionic flocculant is selected from the group consisting of polyacrylamides, copolymers of polyacrylamide and acrylic acid, polyacrylates, acrylonitrites, N-substituted acrylamides, sulfonated polystyrene, sulfonated polyethyleneimine, carboxymethylcelluloses, anionic starches, sulfonated urea-formaldehyde resins, sulfonated melamine-formaldehyde resins, sulfonated phenol-formaldehyde resins, sulfonated urea-melamine-formaldehyde resins, styrene-maleic anhydride polymers, lignosulfonates, humic acids, tannic acids, sulfated castor oil, sodium docecylsulfonate, adipic acid, azuleic acid, and mixtures thereof.

15. The method of claim 9 wherein monomer units of the guanidine salt constitute at least 1 wt % and up to about 58 wt % of the polymer.

16. The method of claim 9 wherein the negatively charged material comprises clay, and wherein the monomer mixture further comprises one or more phenolic compounds.

17. The method of claim 9 wherein sequentially treating the aqueous slurry comprising the negatively charged material with the polymer and the anionic flocculant comprises treating the aqueous slurry with the polymer before treating the aqueous slurry with the anionic flocculant.

18. A froth flotation method for separating a negatively charged material from an aqueous slurry, comprising:

reacting a monomer mixture comprising formaldehyde, one or more phenolic compounds, and a guanidine salt to form a copolymer having a net cationic charge, wherein the monomer mixture is reacted at a temperature of about 30° C. to about 100° C. for a time period of about 15 minutes to about 3 hours to form the copolymer having the net cationic charge, and wherein the guanidine salt comprises guanidine carbonate, guanidine chloride, guanidine nitrate, or any mixture thereof;

dispersing the copolymer having the net cationic charge in an aqueous slurry comprising a negatively charged material to provide a dispersed mixture;

contacting the dispersed mixture with air bubbles and having a first fraction float to the surface and a second fraction sink to the bottom; and collecting a product from either fraction.

19. The method of claim 18 wherein the guanidine salt comprises guanidine carbonate, and wherein monomer units of the guanidine salt constitute at least 2 wt % to about 40 wt % of the copolymer.

20. The method of claim 18 wherein the second fraction contains more negatively charged material than the first fraction.

21. The method of claim 18 wherein the negatively charged material comprises clay.

22. The method of claim 18 wherein the product is selected from the group consisting of: bitumen, phosphate minerals, lime, gypsum, iron, platinum, gold, palladium, titanium, molybdenum, copper, uranium, chromium, tungsten, manganese, magnesium, lead, zinc, clay, coal, silver, graphite, nickel, bauxite, borax, and borate.

23. The method of claim 18 further comprising:

dispersing a polymer having a net anionic charge in the aqueous slurry after the product from either fraction is collected to provide a second dispersed mixture; and recovering a second product from the second dispersed mixture.

24. A froth flotation method for separating a negatively charged material from an aqueous slurry, comprising:

reacting a monomer mixture comprising formaldehyde and a guanidine salt to form a copolymer having a net cationic charge, wherein the monomer mixture is reacted at a temperature of about 30° C. to about 100° C. for a time period of about 15 minutes to about 3 hours to form the copolymer having the net cationic charge, and wherein the guanidine salt comprises guanidine carbonate, guanidine chloride, guanidine nitrate, or any mixture thereof;

dispersing the copolymer having the net cationic charge in an aqueous slurry comprising a negatively charged material to provide a first dispersed mixture;

contacting the first dispersed mixture with air bubbles and having a first fraction float to the surface and a second fraction sink to the bottom, wherein the second fraction contains more negatively charged material than the first fraction;

separating the first fraction and the second fraction; and dispersing an anionic flocculant in the second fraction to provide a second dispersed mixture, wherein a third fraction floats to the surface of the second dispersed mixture and a fourth fraction sinks to the bottom of the second dispersed mixture, and wherein the fourth fraction contains more negatively charged material than the third fraction.

25. The method of claim 24 wherein the monomer mixture further comprises one or more phenolic compounds.

26. The method of claim 24 wherein the monomer mixture consists of the formaldehyde and the guanidine salt.

27. The method of claim 24 wherein the third fraction comprises a process water.

28. The method of claim 24 wherein the guanidine salt comprises guanidine carbonate, and wherein monomer units of the guanidine salt constitute at least 2 wt % to about 40 wt % of the copolymer.

29. The method of claim 24 wherein the negatively charged material comprises clay.

* * * * *